United States Patent
Junier et al.

(10) Patent No.: US 6,892,748 B2
(45) Date of Patent: May 17, 2005

(54) PLUG VALVE

(76) Inventors: Marius Robert Junier, 11007 Wickersham La., Houston, TX (US) 77042; Thomas Ervin Malone, 21207 River Court Dr., Katy, TX (US) 77449

(*) Notice: Subject to any disclaimer, the term of this patent is extended or adjusted under 35 U.S.C. 154(b) by 0 days.

(21) Appl. No.: 10/916,713

(22) Filed: Aug. 12, 2004

(65) Prior Publication Data

US 2005/0034761 A1 Feb. 17, 2005

Related U.S. Application Data

(60) Provisional application No. 60/494,591, filed on Aug. 12, 2003.

(51) Int. Cl.[7] .......................... B08B 9/02; B08B 9/032; B65G 53/40; F16K 1/38
(52) U.S. Cl. ................ 137/240; 134/102.1; 134/102.2; 134/169 C; 134/169 R; 134/171; 137/238; 137/377; 222/148; 406/132; 406/163; 406/174
(58) Field of Search ......................... 134/102.1, 102.2, 134/166 R, 169 C, 169 R, 171; 137/15.04, 137/15.05, 15.06, 238, 240, 375, 377, 381, 137/382; 208/161, 164; 406/128, 132, 133, 406/163, 174, 139, 140; 222/148

(56) References Cited

U.S. PATENT DOCUMENTS

| 2,378,607 | A | 6/1945 | Watts | 137/240 |
| 2,682,277 | A | 6/1954 | Marshall et al. | 137/240 |
| 4,535,801 | A | 8/1985 | Neale | 137/240 |
| 4,552,490 | A | 11/1985 | Neale | 137/240 |
| 4,827,967 | A | 5/1989 | Junier | 251/214 |
| 5,540,253 | A | 7/1996 | Junier | 137/240 |
| RE36,121 | E | 3/1999 | Junier | 137/240 |
| 6,117,317 | A * | 9/2000 | Dickson et al. | 210/198.2 |
| 6,740,241 | B1 * | 5/2004 | Dickson | 210/198.2 |

* cited by examiner

Primary Examiner—George L. Walton
(74) Attorney, Agent, or Firm—Pearne & Gordon LLP

(57) ABSTRACT

A shield for a plug valve is provided to prevent debris from hindering the movement of moving components of the plug valve. The shield prevents larger sized debris from accumulating at an opening in a wall in which the plug valve is mounted, the wall defining a confined space, such as the interior of a vessel, at least in part. The shield encloses but is spaced from the plug valve and a device is located within a space between the shield and the plug valve for directing a purging gas through the space to sweep away or purge smaller sized debris from the space.

14 Claims, 4 Drawing Sheets

PLUG VALVE

The benefit of provisional application Ser. No. 60/494,591, filed on Aug. 12, 2003 and incorporated herein by reference is claimed for this application.

FIELD OF THE INVENTION

The present invention relates to control valves, and particularly to plug type control valves that control a flow of fluid or fluidized material between confined spaces such as the interiors of vessels and conduits.

DESCRIPTION OF THE RELATED ART

In the chemical and petroleum industries, fluid catalytic methods are employed in which finely divided catalyst particles are maintained suspended in a gas in the so-called "fluid state" under reaction conditions. Particles in the fluid state act in many ways like a liquid and undergo hindered settling. Thus, they may be conveyed from one confined space, such as a vessel, to another confined space, such as a conduit, they develop a pressure head, etc.

Large units can operate continuously on-stream for extended periods of time under closely controlled conditions by employing fluid catalytic procedures. Catalysts in such units in processes where the deposition of undesirable coke or some other contaminant is encountered during the reaction state may be maintained at a predetermined level by continuously circulating the catalyst from a fluid reactor to a regenerator where such coke or other contaminant is removed as by combustion. Fluid units of large capacity, such as a through-put of 60,000 barrels or more of charge per day, are intended to operate on-stream for periods of as long as a year or more without being shut down.

Various applications of catalysts involve high temperature operations in the chemical processing and petroleum refining arts, including their use in a converter such as a fluid catalytic cracking unit or a fluid catalytic hydroforming unit having superimposed upper and lower contact chambers in which the catalyst is maintained in a state of phase separation comprising an upper diffuse phase and a lower dense pseudo-liquid phase. The catalyst is withdrawn from the lower dense phase of the upper chamber through a vertical internal standpipe and discharged at a low point within the dense phase of the lower chamber and, after suitable treatment in the lower chamber, is returned upwardly through an internal vertical carrier line to the dense phase of the upper chamber.

By passing a catalyst by gravity flow from the upper chamber to the lower chamber through a standpipe and passing the catalyst from the lower chamber to the upper chamber through a carrier line by aspiration into a stream of the gas to be contacted in the upper chamber, a continuous flow of the mixture through the carrier line is produced. In those cases where a regeneration zone is superimposed upon a conversion zone, the gas introduced into the carrier line ordinarily is air or some other oxygen-containing gas. In those cases where the conversion zone is superimposed upon the regeneration zone, the gas introduced into the carrier line is a stream of vaporous hydrocarbons.

Flow control of the catalyst from the standpipe into the dense phase of the lower chamber and from the latter into the carrier line for conveyance into the upper chamber is attained by the use of plug valves positioned in the lower chamber and engageable with the lower ends of the transfer lines, the plug valves having elongated valve stems extending through the chamber wall that are controlled in their longitudinal movement by external automatic or manual operating means. These plug valves are used in oil refineries in controlling the flow of the catalyst into a reaction chamber that is subject to temperature extremes, for example, in the range of 1500.degree. F., as well as in other industrial applications wherein the valves are subject to oppositely directed displacements due to thermal expansion and spring forces.

Vessel or container-mounted plug valves for high temperature catalyst service are equipped with guide liners and bleed rings which guide the valve stems or stem tubes and are purged by a purge medium. The purpose of the purge medium is to keep the fluidized catalyst particles out of the guide liners and bleed rings utilized with these valves.

SUMMARY OF THE INVENTION

The following presents a summary of the invention in order to provide a basic understanding of certain aspects of the invention. This summary is not an extensive overview of the invention. It is not intended to either identify key or critical elements of the invention or delineate the scope of the invention. Its sole purpose is to present certain concepts of the invention in a simplified form as a prelude to the more detailed description of the invention that follows.

In accordance with the invention, a shield for a plug valve together with a gas purging device are provided to prevent debris, including fluidized particles that drop out of suspension, from interfering with the operation of the plug valve. The shield, according to one embodiment, includes a hollow cylindrical portion which substantially surrounds the plug valve's moving components in a spaced relationship. However, a shield of any desired shape can be employed. The shield prevents larger debris from accumulating on the portion of a vessel to which the plug valve is mounted in the space between the shield and the plug valve. A fluidizing ring is also provided in a space between the shield and the plug valve to remove smaller debris out of the space between the shield and the plug valve.

Thus, according to a first aspect, a shield is provided for use with a plug valve that is adapted to control the flow of a fluid between a first confined space and a second confined space that has an opening for providing fluid communication between the first confined space and the second confined space. The plug valve includes (a) a first section that alternatively closes off flow of the fluid and allows flow of the fluid between the first confined space and the second confined space through the opening in the second confined space when the plug valve is actuated to close off the flow or allow the flow, respectively, (b) a second section that is mounted in an opening in a wall that defines the first confined space at least in part and (c) an intermediate section that connects the first section and the second section of the plug valve and includes one or more moving components that are exposed to the fluid in the first confined space and move in the direction of the opening in the wall in which the second section of the plug valve is mounted when the plug valve is actuated to either close off or allow the flow of fluid between the first and second confined spaces. In the environment in which the plug valve operates, there is a tendency for debris of a range of sizes to accumulate in the first confined space at the opening in the wall at which the second section of the plug valve is mounted and hinder the movement of the moving components of the intermediate section of the plug valve in the direction of the opening in the wall, thereby interfering with the operation of the plug valve. The shield for the plug valve extends between a first end located toward the first section of the plug valve and a second end located adjacent the second section of the plug valve and the opening in the wall in which the second section of the plug valve is mounted. The shield encloses at least a portion of the intermediate section of the plug valve in a spaced relationship so as to establish a space therebetween in which the moving components of the intermediate section of the plug valve may move. The shield prevents the accumulation of at least the larger sized debris in the space between the shield and the intermediate section of the plug valve, thereby allowing for the substantially unhindered movement of the moving components of the intermediate section of the plug valve in the space between the shield and the intermediate section of the plug valve in the direction of the opening in the wall in which the second section of the plug valve is mounted.

According to a second aspect, the intermediate section of the plug valve includes as one of its moving components a protective shroud for at least a portion of the intermediate section of the plug valve. The protective shroud has a first end and a second end. The first end of the shroud is located adjacent the first section of the plug valve and the second end of the shroud lies within the space between the shield and the intermediate section of the plug valve.

According to further aspects, the space between the shield and the intermediate section of the plug valve at the first end of the shield forms a passageway between the first confined space and the space between the shield and the intermediate section of the plug valve. The passageway is sufficiently narrow to prevent the passage of larger sized debris through the passageway. In a particular aspect the passageway is formed between the protective shroud and the first end of the shield.

According to yet another aspect, means are included for directing a purging gas into the space between the shield and the intermediate section of the plug valve and out the passageway together with any smaller sized debris that the purging gas entrains as it passes through the space. Additionally, the means for directing a purging gas may include a device located in the space between the shield and the intermediate section of the plug valve adjacent the second section of the plug valve and substantially encircling the plug valve. The device includes a plurality of outlets for directing the purging gas, together with any entrained at least smaller sized debris, out the passageway.

According to still another aspect, the shield comprises a generally cylindrical exterior with a truncated generally conical exterior at the first end of the shield. The truncated end of the truncated generally conical exterior of the shield and the intermediate section of the plug valve form the passageway between the first confined space and the space between the shield and the intermediate section of the plug valve.

To the accomplishment of the foregoing and related ends, the invention comprises the features hereinafter fully described. The following description and the annexed drawings set forth in detail certain illustrative aspects of the invention. These aspects are indicative of but a few of the various ways in which the principles of the invention may be employed and the present invention is intended to include not only all such aspects but their equivalents as well. Other objects, advantages and novel features of the invention will become apparent from the following detailed description of the invention when considered in conjunction with the drawings.

DETAILED DESCRIPTION OF THE PREFERRED EMBODIMENTS OF THE INVENTION

Figure 1:
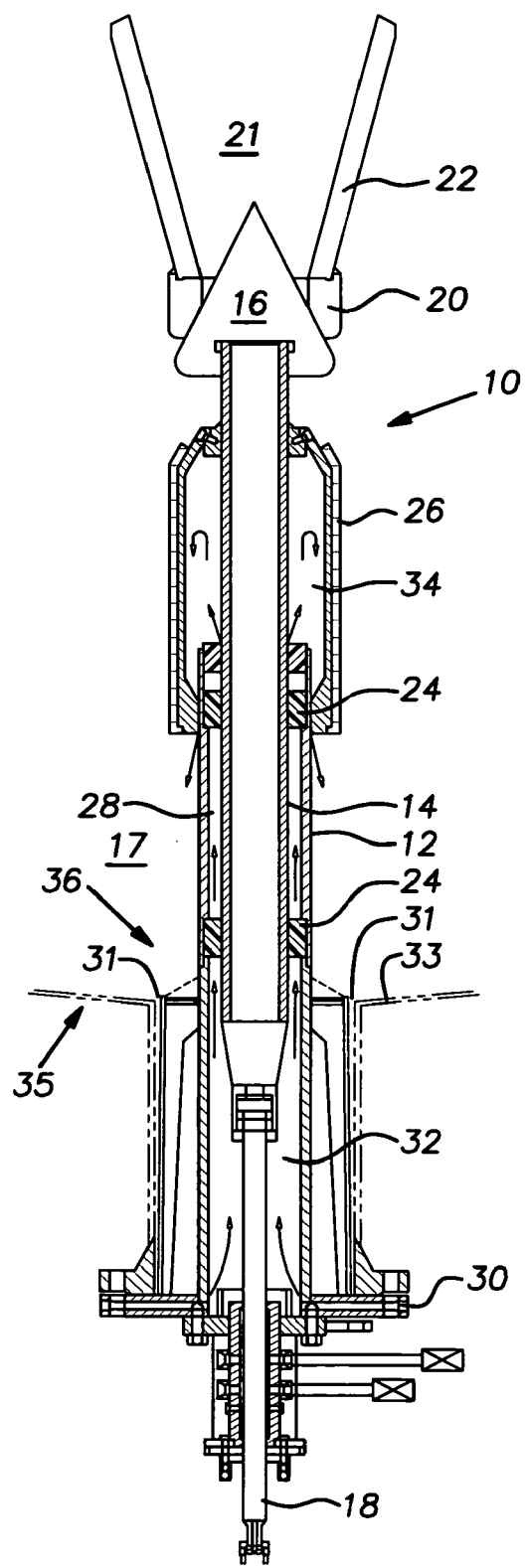
FIG. 1 illustrates a cross-sectional side view of a first type of plug valve.

The present invention provides a shield and a purging device for a plug valve that is adapted to be located in a first confined space, such as a chamber or vessel, to control the flow of a fluid between the first confined space and a second confined space, such as a conduit, through an opening in the second confined space, the opening in the second confined space providing for fluid communication between the first confined space and the second confined space. As used herein, the word "fluid" is intended to comprehend any substance that is in a fluid state.

The present invention is described hereafter with reference to the drawings, wherein like reference numerals are used to refer to like elements throughout. It is to be appreciated that the various drawings are not necessarily drawn to scale from one figure to another nor inside a given figure, and the size of the components are arbitrarily drawn for facilitating the understanding of the drawings. In the following description, for purposes of explanation, numerous specific details are set forth in order to provide a thorough understanding of the present invention. It will be evident, however, that the present invention may be practiced without these specific details.

Referring initially to FIG. 1, a first plug valve 10 that is not provided with either the shield or the purging device of the invention is illustrated. The plug valve 10 includes a guide tube 12 and a hollow stem tube 14 that is movably disposed within the guide tube 12. A substantial portion of the plug valve 10 is located in a first confined space 17 that is defined by the wall 33 of a vessel 35 that is designated by dotted lines and may comprise a regenerator vessel. Consequently the substantial portion of the plug valve is exposed to the fluid in the confined space. It is to be understood, as explained above, that the term "fluid" is inclusive of fluidized material such as finely divided catalyst particles that are maintained suspended in a gas in a fluid state.

The plug valve 10 includes a plug closure member 16 that is secured to one end of the stem tube 14. An actuator 18 is coupled to the other end of the stem tube 14. The actuator effects movement of the stem tube 14 up and down within the guide tube 12 to provide engagement and disengagement between the plug closure member 16 and a valve seat 20 located in an opening in a second confined space 21 that is defined by a conduit 22. The plug closure member 16 is alternatively seated on the valve seat 20 to close off or prevent flow into and through the conduit 22 and moved away from the valve seat 20 to allow the flow of fluid between the first confined space 17 in vessel 35 and the second confined space 21 in conduit 22. Guide liner bearings 24 facilitate the movement of the stem tube 14 in the guide tube 12.

The plug valve 10 includes a protective shroud 26 that is secured to the stem tube 14. The shroud 26 protects the stem tube 14 from erosion due to catalyst flow against the stem tube 14 in the first confined space 17 of the vessel 35.

A continuous purge system is provided which is in communication with an annular space 28 formed between the guide tube 12 and the stem tube 14. A suitable purge fluid or medium such as air, nitrogen, steam (with steam traps), or the like is injected through an inlet 30 into a chamber 32, which is in fluid communication with the annular space 28. A fluid pressure or pumping source (not shown) pumps the fluid to the inlet 30 at a desired pressure. A pressure indicator (not shown) is disposed in the purge system for providing pressure readings for the fluid injected into the chamber 32.

The purging system provides continuous purging for the chamber 32, the annular space 28 between the guide tube 12 and the stem tube 14, the bearings 24 and the space 34 between the shroud 26 and the stem tube 14. The purging fluid exits out the lower end of the shroud 26 with any entrained debris as indicated by the arrows. The purging system for the plug valve illustrated in FIG. 1 is a continuous system in that the purging medium is flowing and purging continuously.

The plug valve illustrated in FIG. 1 is mounted in an opening 31 in the wall 33 of vessel 35 and is shown in a vertical position in which a catalyst stream can flow by gravity from the confined space 21 within conduit 22 into the confined space 17 within vessel 35 when the plug closure member 16 is moved downwardly away from the valve seat 20. The vessel 35 serves to contain fluidized catalyst. Accordingly, the plug valve 10, operates to control a level of catalyst in the vessel 35.

A problem occurring with plug valves, such as plug valve 10, is the tendency for debris of a range of sizes to accumulate and interfere with the operation of the plug valve. Specifically, plug valve movement can be restricted by the accumulation of debris at 36 around the opening 33 in vessel 35 in which the plug valve 10 is mounted. Thus, it is common for sufficient debris to accumulate at 36 such that the bottom of the shroud 26 comes into contact with the debris when the valve stem 14 is actuated before the valve stem can move downward sufficiently to allow the plug closure member 16 to move away from valve seat 20 and allow the flow of fluid between the confined spaces 17 and 21. Typically, the debris is in the form of chunks of refractory material that have broken away from a wall of vessel 35.

Figure 2:
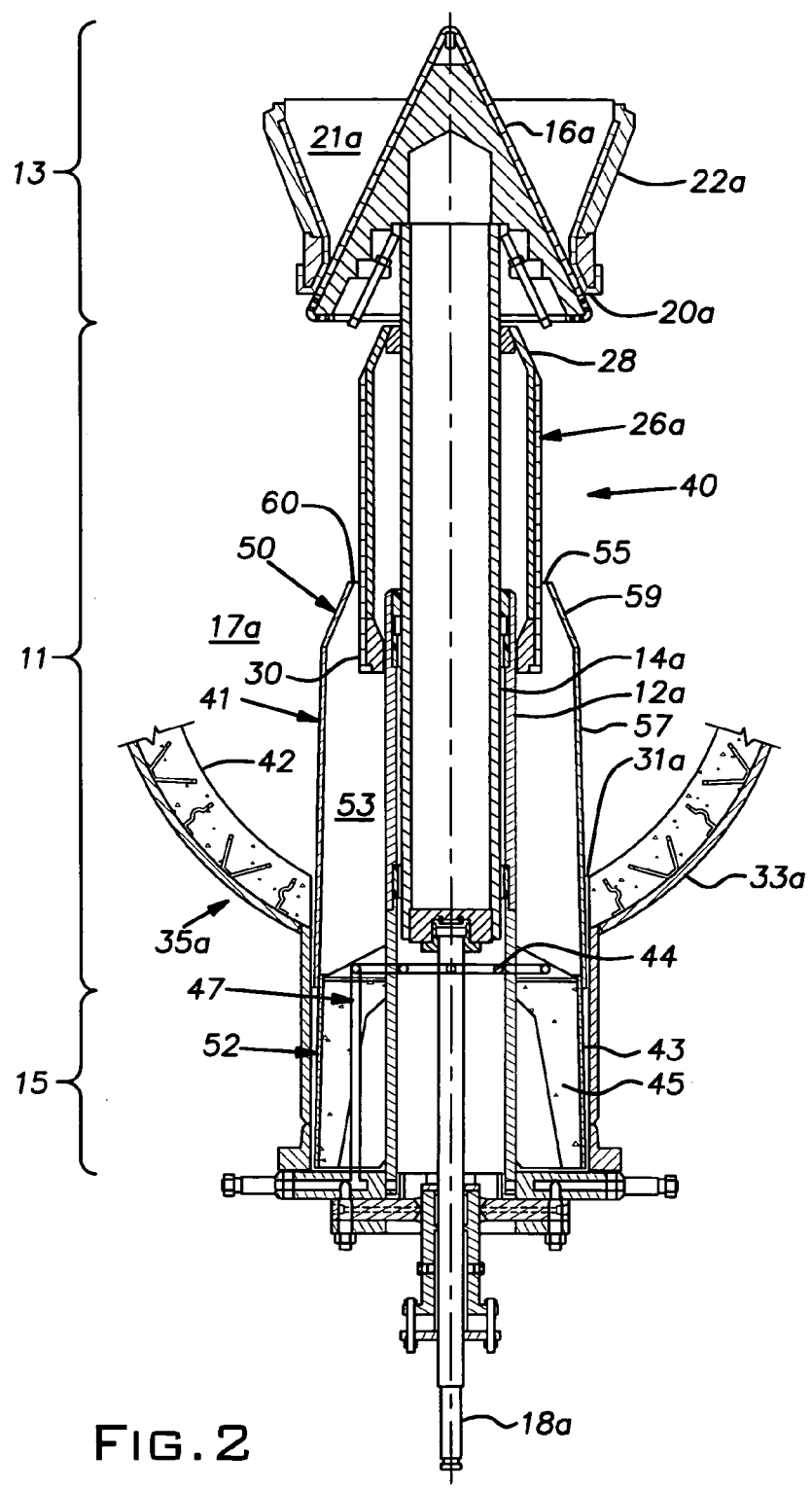
FIG. 2 illustrates a cross-sectional side view of a second type of plug valve in a closed position, the plug valve having a shield and a gas purging device in the form of a fluidizing ring in accordance with an aspect of the present invention.
Figure 3:
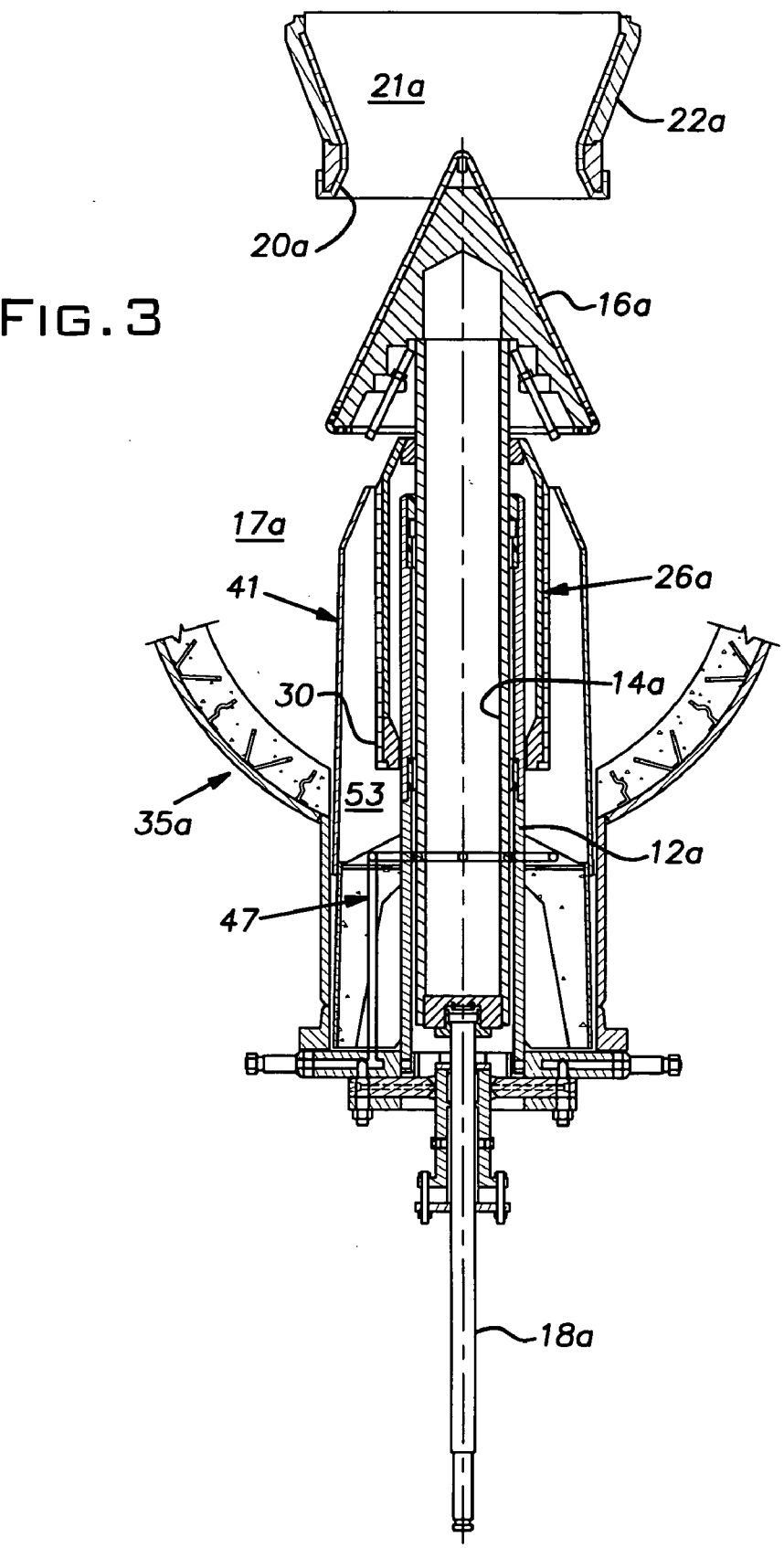
FIG. 3 illustrates a cross-sectional side view of the plug valve of FIG. 2 in an open position in accordance with an aspect of the present invention.
Figure 4:
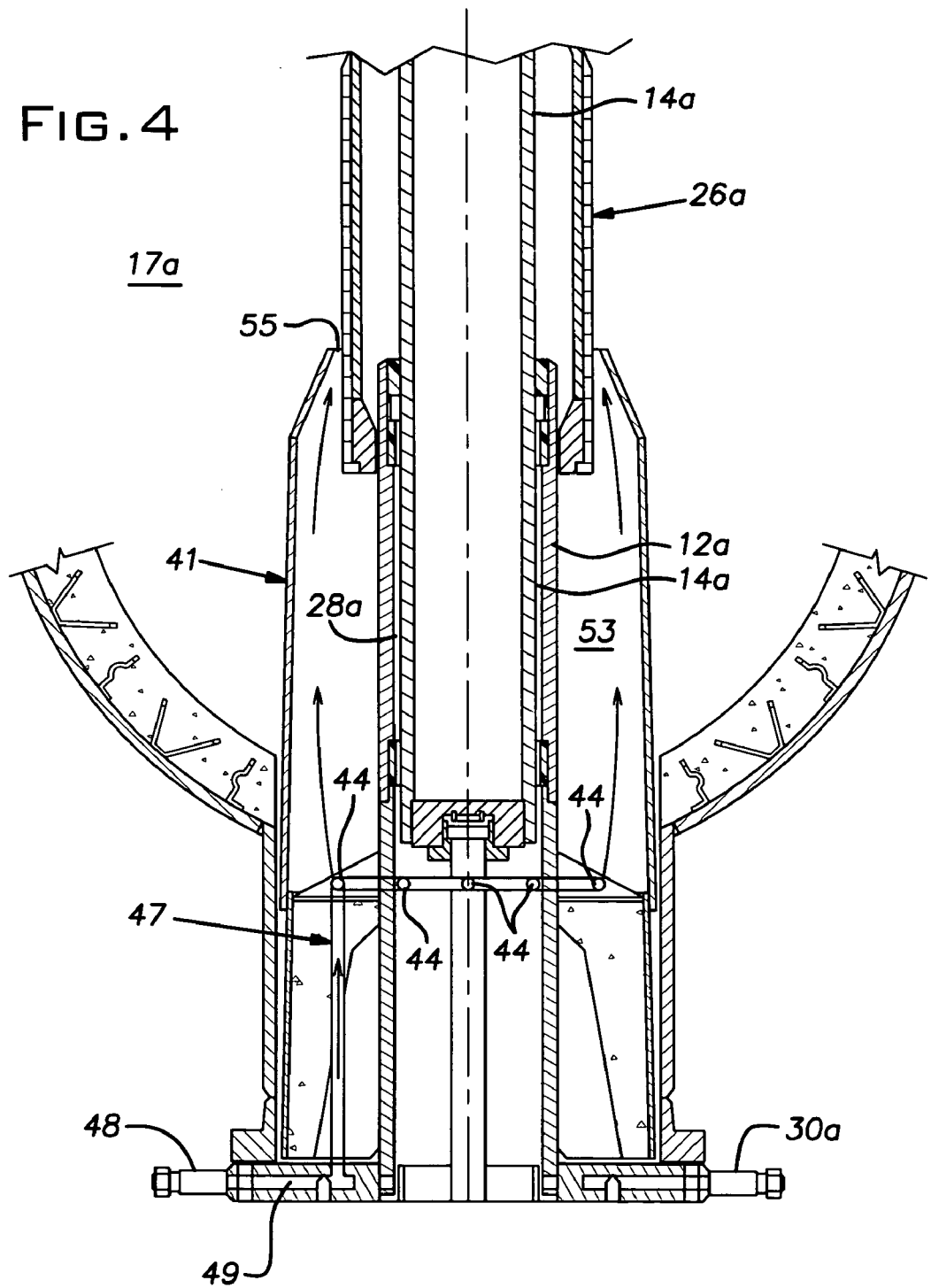
FIG. 4 illustrates a cross-sectional partial view of the plug valve of FIG. 2 in greater detail in accordance with an aspect of the present invention.

FIGS. 2–4 illustrate a second plug valve 40 for which a shield in accordance with the present invention has been provided. It will be understood from the description of the invention that follows that the shield of the invention, although only illustrated in use with the second plug valve 40, can also be used with the first plug valve shown in FIG. 1 as well as with other types of plug valves as, for example, disclosed in U.S. Pat. No. Re. 36,121. The plug valve 40 includes a plurality of components similar to those of the plug valve 10 illustrated in FIG. 1 and the same reference numerals are used in FIGS. 1–4 to indicate parts that are similar. However, the reference letter "a" is employed with the reference numerals in FIGS. 2–4 to designate these similar parts in the plug valve 40.

Turning now to FIGS. 2 and 3, the plug valve 40 of the present invention comprises, in general, a first section 13, a second section 15 and an intermediate section 11 connecting first section 13 and second section 15. As with the first type of plug valve 10 described above, the second type of plug valve 40 is adapted to control the flow of a fluid between a first confined space 17a, such as the interior of a regenerator vessel 35a, and a second confined space 21a, such as the interior of a conduit 22a, having an opening in the form of a valve seat 20a that provides for fluid communication between the first confined space and the second confined space.

As described in greater detail below, the first section 13 of the plug valve 40 alternatively closes off flow of the fluid and allows flow of the fluid between the first confined space 17a and the second confined space 21a through the opening 20a in the second confined space 21a when the plug valve is actuated to close off the flow or allow the flow, respectively. The second section 15 of the plug valve 40 is mounted in an opening 31a in a wall 33a that defines the first confined space 17a at least in part. The intermediate section 11 of the plug valve 40 connects the first section 13 and the second section 15 of the plug valve 40 and includes one or more moving components that move in the direction of the opening 31a in the wall 33a in which the second section 15 of the plug valve is mounted when the plug valve is actuated to either close off or allow the flow of fluid between the first and second confined spaces 17a and 21a, respectively. In the configuration illustrated in FIGS. 2–4, for purposes of facilitating the description of the invention, the plug valve 40 is shown as being mounted vertically in the opening 31a in the wall 33a at the bottom of the regenerator vessel 35a. As a result, catalyst fluid can flow downwardly from the second confined space 21a through the opening 20a in the conduit 22a into the confined space 17a of the vessel 35a when the plug closure member 16a of the first section of the plug valve 40 is withdrawn from the opening 20a, as depicted in FIG. 3. Conversely, when the plug closure member 16a engages the valve seat of opening 20a the flow of fluid between the first confined space 17a and the second confined space 21a does not take place. Thus, the first section 13 alternatively closes off flow of the fluid and allows flow of the fluid between the first confined space 17a and the second confined space 21a through the opening 20a in the second confined space 21a. With this arrangement, the intermediate section 11 of the plug valve is located in the interior of the first confined space 17a so as to be exposed to the fluid in the first confined space.

As with the first type of plug valve 10 shown in FIG. 1, plug valve 40 includes a guide tube 12a and a hollow stem tube 14a that is movably disposed within the guide tube 12a. The plug closure member 16a is secured to one end of the stem tube 14a and an actuator 18a is coupled to the other end of stem tube 14a. The actuator alternatively moves the stem tube 14a up and down within the guide tube 12a to provide engagement and disengagement between the plug closure member 16a and valve seat 20a. As will be understood, the engaging surfaces of the closure member 16a and the valve seat 20a can be reversed so that the opening in the confined space 21a formed by the valve seat 20a is opened by moving the closure member upwardly and closed by moving the closure member downwardly.

The plug valve 40 also includes a protective shroud 26a that is secured to the stem tube 14a and protects the stem tube 14a from erosion due to catalyst flow against the stem tube 14a in the vessel 35a. The shroud 26a will move together with the stem tube 14a as the stem tube moves upwardly and downwardly under the influence of actuator 18a. Thus the shroud 26a comprises one of the moving components included with the intermediate section 11a of the plug valve 40 that moves in the direction of the opening 31a in the wall 33a in which the second section 15 of the plug valve 40 is mounted when the plug valve is actuated to either close off or allow the flow of fluid between the first and second confined spaces 17a and 21a, respectively, depending on whether the valve seat 20a and the closure member 16a are arranged to allow flow by the downward movement of the closure member or by the upward movement by the closure member.

In the difficult environment in which the plug valve 40 functions, there is a tendency for debris of a range of sizes to accumulate and interfere with the operation of the plug valve. Specifically, chunks of the refractory lining 42 of the vessel 35a can break away from the wall 33a and the debris accumulates at the bottom portion of the vessel 35a around the guide tube 14a in the manner described above in reference to plug valve 10. The debris can accumulate to the extent that it hinders the movement of the shroud 26a in the direction of the opening 31a, thereby interfering with the operation of the plug valve 40.

In order to prevent the accumulation of debris that interferes with the operation of the plug valve 40 an improvement comprising a shield 41 is provided. The shield 41 prevents at least some of the debris, particularly the larger sized debris, from interfering with the movement of the moving components of the plug valve, such as the shroud 26a.

The shield 41 extends between a first end 50 located toward the first section 13a of the plug valve 40 and a second end 52 located adjacent the second section 15a of the plug valve 40 and the opening 31a in the wall 33a of the vessel 35a. The shield 41 encloses a portion of the intermediate section 11 of the plug valve so as to establish a space 53 between the two in which the shroud 26a, as a moving component of the intermediate section of the plug valve, may move. As will be understood, the shield 41 will prevent the accumulation of at least the larger sized debris in the space 53 between the shield and the intermediate section of the plug valve, thereby allowing for the substantially unhindered movement of the moving components of the intermediate section of the plug valve, such as the shroud 26a, in the space 53 in the direction of the opening 31a in the wall 33a of the vessel 35a in which the second section 15 of the plug valve is mounted. In this regard the space 53 between the shield 41 and the intermediate section 11 of the plug valve 40 at the first end 50 of the shield forms a passageway 55 between the first confined space 17a and the space 53. The passageway 55 is sufficiently narrow so as to prevent the passage of larger sized debris through the passageway and into space 53.

In the embodiment of the invention shown in FIGS. 2–4, the shield 41 has a generally cylindrical exterior 57 with a truncated generally conical exterior 59 at the first end 50 of the shield. The truncated end 60 of the truncated generally conical exterior 59 of the shield 41 and the intermediate section 11 of the plug valve 40 form the passageway 55 between the first confined space 17a and the space 53. Specifically, the shroud 26a has a first end 28 that is located adjacent the first section 13 of the plug valve 40 and a second end 30 that lies within the space 53 between the shield 41 and the intermediate section 11 of the plug valve 40. Thus, the passageway 55 is formed by the truncated end 60 of the truncated generally conical exterior 59 of the shield 41 and the shroud 26a. The tapered configuration of the truncated generally conical exterior 59 of the shield 41 functions to direct debris away from the passageway 55.

The shield 41 includes a base portion 43 that generally encloses the second section 15 of the plug valve 40 and is appropriately mounted within the opening 33. A refractory material 45 is provided in the space between the base portion 43 of the shield 41 and the second section 15 of the plug valve.

While the shield 41 has been described as having a generally cylindrical configuration, it is to be appreciated that the shield can have any suitable configuration, such as rectangular, without departing from the scope of the present invention.

Although the shield 41 functions effectively to keep the space 53 free of larger sized debris, it is possible for smaller sized debris, such as catalyst particles that drop out of suspension, to enter the passageway 55 between the shield 41 and the shroud 26a. In order to deal with such an eventuality, the invention includes a means for directing a purging gas into the space 53 between the shield 41 and the intermediate section of the plug valve and out the passageway 55 at the first end of the shield. In the embodiment of the invention shown in the drawings, the means for directing a purging gas includes a device 47 that is located in the space 55 between the shield 41 and the plug valve 40 adjacent the second section 15 of the plug valve. The device 47, that is in the form of a fluidizing ring, substantially encircles the plug valve and includes a plurality of outlets 44 for directing the purging gas, together with any entrained at least smaller sized debris out of space 53 and through passageway 55.

Turning now to FIG. 4, the fluidizing ring 47 is illustrated in further detail. As has been described, the confined space 17a contains fluidized solids, fine particles of a catalyst material, floating throughout the confined space. These small particles can enter the passageway 55 and accumulate in space 53, thereby interfering with the moving components of the plug valve 40 such as shroud 26a. Thus, the fluidizing ring 47 operates to fluidize the debris within space 53 and purge the debris out passageway 55. A suitable fluidizing medium such as air, nitrogen, steam (with steam traps), or the like is injected through an inlet 48 into a port 49, which is in fluid communication with the fluidizing ring 47. A fluid pressure or pumping source (not shown) pumps the fluid to the inlet 48 at a desired pressure. Further, a pressure indicator (not shown) can be connected to the fluidizing ring 47 to provide a pressure reading for the fluidizing medium. The fluidizing ring 47 substantially encircles the plug valve 40 and the outlets 44 direct the purging gas, together with any entrained at least smaller sized debris, out the passageway 55 at the first end of the shield. Thus, the fluidizing medium after exiting outlets 44 flows upwards through the space 53, as indicated by the arrows in FIG. 4, and exits through the passageway 55, thereby removing the smaller sized debris from the space 53.

Accordingly, the debris shield 41 of the present invention prevents both large and small debris particles from interfering with the moving components of the plug valve 40. The larger debris is kept away from the moving components by the debris shield 41 while the space 53 is kept free of the smaller debris by the fluidizing ring 47. Thus, unhindered movement of the moving components of the plug valve is accomplished.

In addition to the purging gas introduced into space 53, additional purging gas can be passed through annular space 28a formed between the guide tube 12a and the stem tube 14a in a manner similar to that described above in connection with plug valve 10 shown in FIG. 1. For that purpose, the fluid inlet 30a is provided.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations.

What is claimed is:

1. For use with a plug valve adapted to control the flow of a fluid between a first confined space and a second confined space having an opening that provides for fluid communication between the first confined space and the second confined space, the plug valve including (a) a first section that alternatively closes off flow of the fluid and allows flow of the fluid between the first confined space and the second confined space through the opening in the second confined space when the plug valve is actuated to close off the flow or allow the flow, respectively, (b) a second section that is mounted in an opening in a wall that defines the first confined space at least in part and (c) an intermediate section that connects the first section and the second section of the plug valve and includes one or more moving components that are exposed to the fluid in the first confined space and move in the direction of the opening in the wall in which the second section of the plug valve is mounted when the plug valve is actuated to either close off or allow the flow of fluid between the first and second confined spaces, the improvement comprising:

a shield for the plug valve, the shield extending between a first end located toward the first section of the plug valve and a second end located adjacent the second section of the plug valve and the opening in the wall in which the second section of the plug valve is mounted and enclosing at least a portion of the intermediate section of the plug valve in a spaced relationship so as to establish a space therebetween in which the moving components of the intermediate section of the plug valve move, the shield preventing the accumulation of at least some of the debris in the space between the shield and the intermediate section of the plug valve.

2. The shield of claim 1 wherein the space between the shield and the intermediate section of the plug valve at the first end of the shield forms a passageway between the first confined space and the space between the shield and the intermediate section of the plug valve, the passageway being sufficiently narrow so as to prevent the passage of at least some of the debris through the passageway.

3. The shield of claim 2 including means for directing a purging gas into the space between the shield and the intermediate section of the plug valve and out the passageway.

4. The shield of claim 3 wherein the means for directing a purging gas includes a device located in the space between the shield and the intermediate section of the plug valve adjacent the second section of the plug valve and substantially encircling the plug valve, the device including a plurality of outlets for directing the purging gas, together with any debris, out the passageway.

5. The shield of claim 4 wherein the shield has a generally cylindrical exterior with a truncated generally conical exterior at the first end of the shield, the truncated end of the truncated generally conical exterior of the shield and the intermediate section of the plug valve forming the passageway between the first confined space and the space between the shield and the intermediate section of the plug valve.

6. The shield of claim 1 wherein the shield is positioned to prevent the debris from hindering movement of the moving components of the intermediate section of the plug valve between the shield and the intermediate section of the plug valve in the direction of the opening in the wall in which the second section of the plug valve is mounted.

7. The shield of claim 1 wherein the intermediate section of the plug valve includes as one of its moving components a protective shroud for at least a portion of the intermediate section of the plug valve, the shroud having a first end and a second end, the first end of the shroud being located adjacent the first section of the plug valve and the second end of the shroud lying within the space between the shield and the intermediate section of the plug valve.

8. The shield of claim 7 wherein the first end of the shield is spaced from the shroud so as to establish a passageway between the first confined space and the space between the shield and the intermediate section of the plug valve, the passageway being sufficiently narrow so as to prevent the passage of the larger sized debris through the passageway.

9. The shield of claim 8 including means for directing a purging gas into the space between the shield and the intermediate section of the plug valve and out the passageway.

10. The shield of claim 9 wherein the means for directing a purging gas includes a device located in the space between the shield and the intermediate section of the plug valve adjacent the second section of the plug valve and substantially encircling the plug valve, the device including a plurality of outlets for directing the purging gas, together with any entrained at least smaller sized debris, out the passageway.

11. The shield of claim 10 wherein the shield has a generally cylindrical exterior with a truncated generally conical exterior at the first end of the shield, the truncated end of the truncated generally conical exterior of the shield and the shroud forming the passageway between the first confined space and the space between the shield and the intermediate section of the plug valve.

12. The shield of claim 7 wherein the shield is positioned to prevent the debris from hindering movement of the moving components of the intermediate section of the plug valve between the shield and the intermediate section of the plug valve in the direction of the opening in the wall in which the second section of the plug valve is mounted.

13. A plug valve adapted to control the flow of a fluid between a first confined space and a second confined space having an opening that provides for fluid communication between the first confined space and the second confined space, the plug valve including (a) a first section that alternatively closes off flow of the fluid and allows flow of the fluid between the first confined space and the second confined space through the opening in the second confined space when the plug valve is actuated to close off the flow or allow the flow, respectively, (b) a second section that is mounted in an opening in a wall that defines the first confined space at least in part and (c) an intermediate section that connects the first section and the second section of the plug valve and includes one or more moving components that are exposed to the fluid in the first confined space and move in the direction of the opening in the wall in which the second section of the plug valve is mounted when the plug valve is actuated to either close off or allow the flow of fluid between the first and second confined spaces;

a shield for the plug valve, the shield extending between a first end located toward the first section of the plug valve and a second end located adjacent the second section of the plug valve and the opening in the wall in which the second section of the plug valve is mounted and enclosing at least a portion of the intermediate section of the plug valve in a spaced relationship so as to establish a space therebetween in which the moving components of the intermediate section of the plug valve move, the shield preventing the accumulation of at least some of the debris in the space between the shield and the intermediate section of the plug valve.

14. The plug valve of claim 13 wherein the intermediate section of the plug valve includes as one of its moving components a protective shroud for at least a portion of the intermediate section of the plug valve, the shroud having a first end and a second end, the first end of the shroud being located adjacent the first section of the plug valve and the second end of the shroud lying within the space between the shield and the intermediate section of the plug valve.

* * * * *